Patented June 10, 1952

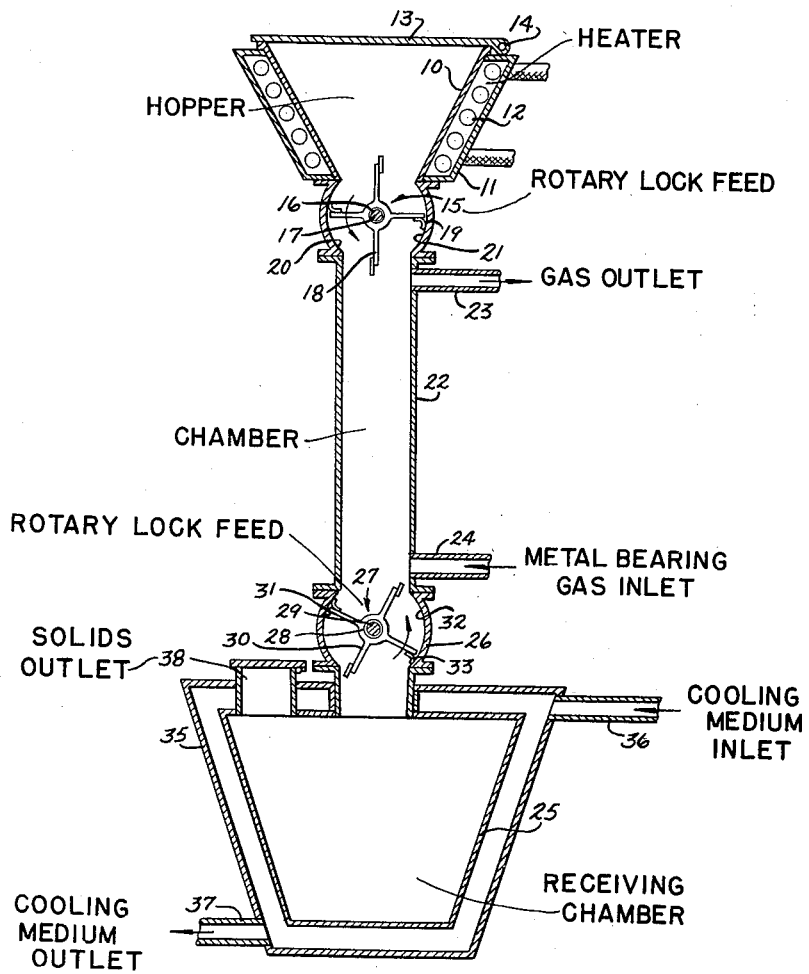

2,599,978

UNITED STATES PATENT OFFICE 2,599,978

PROCESS OF PLATING CARRIER PARTICLES WITH A CATALYTIC METAL

Oliver F. Davis and Herman Nack, Troy, Ohio, assignors to The Commonwealth Engineering Company of Ohio, Dayton, Ohio, a corporation of Ohio Application April 15, 1949, Serial No. 87,588

6 Claims. (Cl. 252—472)

This invention relates to the preparation of catalysts. More particularly, it relates to the covering of core material with active surface layers of catalytically active agents.

Still more particularly, it relates to the depositing of thin porous layers of catalytic metals on core material.

The velocity of chemical reactions may be markedly accelerated by agents which do not appear in the final products. Those agents are known as catalysts.

In the chemical industry, petroleum industry, and the like, catalysts capable of accomplishing cracking, hydrogenation, dehydrogenation, and similar activity, whether in the liquid or vapor phases, have become important tools.

The value of these tools is directly related to the speed and completeness of the reaction fostered. This metal contact reaction, which is believed related to adsorption of monomolecular layers of material on the surface of the catalyst, depends to a large extent on the surface available to adsorb gas or liquid constituents.

In the past one method of preparing catalysts has been to disintegrate metals electrically to form colloidal suspension. These metallic suspensions have presented problems of separation from the product upon completion of the reaction because of their fineness.

Sintering has been used as a method of preparing catalysts, also reduction of metal oxide powders to metal by reducing agents such as hydrogen.

The ratio of surface to volume in all of these catalysts has proved to be low by comparison with some non-metallic materials.

It is the purpose of this invention to provide a process which deposits a coating upon base material which has a markedly increased ratio of surface to volume.

It is another object of this invention to provide a process which quickly prepares catalysts of a porous nature and therefore greater activity.

It is another object of this invention to provide a process wherein the catalytic metallic surface layers may be quickly restored to initial activity by replacing surface layers with new layers of porous material.

Another object of this invention is to provide catalysts of improved activity.

Still another object of this invention is to provide a process for continuously depositing coating of catalytically active metals.

A further object of this invention is to provide a process for the continuous coating of base material wherein the thickness of the porous coating is determined by the speed of passage through the plating zone.

A still further object of this invention is to provide a process wherein the final catalytic metal coating is under direct control whereby bright metal or metal oxide films are the final products.

The method of preparing the active catalysts of this invention comprises segregating a stream of fragmentary core material in an isolated space where it is maintained in continuous motion; continually depositing a thin porous coating of catalytically active metal on said fragments; and continuously removing the coated fragments to a controlled atmosphere cooling zone.

More specifically, the fragmentary material to be coated is heated, preferably in an inert atmosphere to a temperature which decomposes volatile metal compounds, whereby the metal is deposited on the fragments and continuously passed into an isolated space, where metal is deposited from a stream of gas flowing through the moving bed of core material.

From the bottom of the isolated space a portion of the coated core material is continuously removed for cooling in a receiver in which the atmosphere may be controlled to avoid or to effect oxidation of the porous catalytically active coating.

The apparatus for carrying out the process will be more completely understood from a description of a preferred embodiment thereof illustrated in the drawing. In this drawing:

Figure 1 is a vertical sectional view of a complete plating unit.

In this process the metal to be plated is introduced into the plating zone in vapor form. This vapor may be concentrated or diluted with inert gas.

One particularly advantageous method of bringing metal as vapors into the plating zone is in the form of readily decomposable gaseous compounds. For example, the metals may be introduced as gaseous metal carbonyls, also nitroxyl compounds, nitrosyl carbonyls, metal hydrides, metal alkyls, metal halides, and the like.

Catalytically active metals which may be deposited are iron, nickel, cobalt, chromium, molybdenum, tungsten, tellurium, selenium, tin, zinc, and the like.

Illustrative compounds of the carbonyl type are nickel, iron, chromium, molybdenum, cobalt.

Illustrative compounds of other groups are nitroxyls, such as copper nitroxyl, nitrosyl carbonyls, for example, cobalt nitrosyl carbonyl, hydrides, such as tellurium hydride, selenium hydride, antimony hydride, tin hydride, chromium hydride, the mixed organo-metallo hydrides, such as dimethyl alumino hydride, metal alkyls such as tetraethyl lead, metal halides such as chromyl chloride, and carbonyl halogens, for example, osmium carbonyl bromide, ruthenium carbonyl chloride, and the like.

When the metal bearing gases are diluted such inert gases as carbon dioxide, helium, nitrogen, hydrogen, the gaseous products of controlled burning of hydrocarbon gases free of oxygen, mixtures of these gases and the like, may be utilized.

Plating may be carried out under a wide variety of conditions. When undiluted vapors are fed to the plating zone, it is generally preferable to feed the vapors under a slight positive pressure, i. e. a pressure above atmospheric. When dilute vapors are fed to the plating zone, a wide range of pressures may be used, running from negative pressures usually expressed in inches of water vacuum to positive pressures usually expressed as pounds per square inch gage.

It will, of course, be understood that the manner of operation in the plating zone will have an effect upon the manner of operation in both the core heating area and the catalyst cooling zone and determine what atmospheres and pressures must be maintained therein to avoid operating difficulties. For example, inert atmospheres must be maintained in both the heating and cooling zones when the plating zone is under sub-atmospheric pressure.

The manner in which the metal bearing vapors are entrained varies from carbureting metal vapors into an inert gas stream maintained under pressure to spraying liquid into hot gas being sucked through the system by vacuum, which gas vaporizes the liquid droplets whereby the liquid is a vapor in the plating zone.

Each material from which metals may be plated has a temperature at which the metal in vapor form is free to deposit as a metal coating. When plating there is an optimum plating range for a large number of, for example, metal carbonyls, running from about 350° F. to 450° F. Decomposition takes place outside this range, but when seeking uniform deposits, it is desirable to operate within the above range and even within the range of 375° F. to 400° F., if it is desired to plate nickel, molybdenum, cobalt, and the like.

The above mentioned 350° F. to 450° F. temperature range is also useful for decomposition of many of the hydrides. However, since each type of metal and each type of compound alters the plating range, applicants merely offer the above as a range for specific embodiments of the invention and not as a limitation upon the operating range of catalytic coating deposition.

Preparatory to coating base material it is necessary that the fragmentary material be cleaned by employing conventional methods used in the art to remove grease and the like. Metallic fragments may be, for example, cleaned by pickling with hydrochloric, sulfuric or nitric acid, or a combination of acids.

This process will be more readily understood from a description thereof with reference to the apparatus and specific examples.

Referring to Figure 1, there is shown a hopper 10. The hopper 10 is surrounder by a jacket 11 within which are positioned suitable heating elements 12, as for example, electrical resistance or induction coils.

At its widest end hopper 10 is provided with a door 13 hinged as at 14 to permit ready access to the hopper. Door 13 serves to prevent free ingress of atmospheric air into the chamber where core fragments are to be raised to the deposition temperature.

At the small end of hopper 10 there is provided a rotary lock mechanism 15. This lock mechanism consists of a hub 16 mounted on a horizontal shaft 17. The hub 16 supports radially disposed arms 18 which carry at their extremities resilient members 19 which move in contact with the front and back wall sections 20 and 21, respectively, of the lock exterior wall connecting the hopper with the housing 22.

Housing 22 is a cylindrically shaped vertically positioned pipe. If desired this housing may be jacketed for cooling purposes. Adjacent the top the housing 22 is provided with a vapor outlet 23 which may be connected to exhausting mechanism (not shown) or to a flue as desired. Adjacent the bottom, housing 22 is provided with a gas inlet 24 which conducts gas from a source not shown.

Housing 22 is supported upon a catalyst receiving chamber 25 by an intermediate housing 26 for a gas tight, unloading lock 27. This lock is substantially identical to lock 15 and consists of a hub 28 mounted on a shaft 29 and having radially extending arms 30.

The arms 30 are adapted for tight sealing with the arcuate front and back wall sections 31 and 32 of intermediate housing 26 by resilient means 33, such as natural rubber, synthetic rubber and synthetic resins with or without flexible base material such as fabric.

Catalyst receiver 25 is provided with a jacket 35 adapted with inlet 36 and outlet 37 for circulation of cooling medium such as gas or liquid. Catalyst receiver 25 is also provided with an outlet 38 for solids which may be adapted for continuous or discontinuous removal of solids from the receiver.

In operation of this equipment, the core material is heated in hopper 10 to the desired temperature, for example, in the range of 375° F. to 400° F. Small increments of fragmentary material are continuously displaced or fed from the hopper 10 to the cylindrical chamber 22 through the lock 15. If leakage of gases from the plating zone is to be prevented, the hopper 10 may be charged with gas under a pressure slightly higher than the pressure maintained in the plating zone.

In the chamber 22, which is maintained full of moving fragmentary material, there percolates through the bed a gaseous stream of, for example, carbon dioxide and molybdenum carbonyl, entering through the inlet 24 and being exhausted, together with the decomposition product gases, through the exhaust duct 23.

The time of passage through the cylindrical chamber is regulated by the locks 15 and 27 to a time for the deposition of the desired depth of coating. This depth of coating generally is a deposit having a thickness of about .0005 to .005. Such a depth of deposit under proper conditions of gaseous feed may be placed upon the fragments in a matter of a few seconds. These coatings must be maintained within this thin coating range in order to obtain the maximum porosity which yields such increased effective surface areas per unit of volume.

It will be understood that while there have been herein described certain specific embodiments of the invention, it is not intended thereby to have it limited to or circumscribed by the details given, in view of the fact that the invention is susceptible to various modifications and changes which come within the spirit of the disclosure and the scope of the appended claims.

We claim:

1. A method of preparing catalysts which comprises the steps of heating core particles in a closure to a temperature sufficient to decompose heat-decomposable metal vapors upon contact therewith, continuously feeding said heated core particles downwardly into a vertically arranged isolated plating zone, continuously introducing heat-decomposable metal vapor into said plating zone counter-current to the direction of movement of said core particles, and continuously removing said core particles from said plating zone after being subjected to a plating action in a non-oxidizing atmosphere for a length of time sufficient to deposit metal by decomposition of said metal vapors onto said core particles to a depth of about 0.0005 to about 0.005 inches.

2. A method of preparing catalysts which comprises the steps of heating core particles in a closure to a temperature sufficient to decompose a metal vapor comprising nickel carbonyl upon contact therewith, continuously feeding said heated core particles downwardly into a vertically arranged isolated plating zone, continuously introducing a gas comprising nickel carbonyl into said plating zone counter-current to the direction of movement of said core particles, and continuously removing said core particles from said plating zone after being subjected to a plating action in a non-oxidizing atmosphere for a time sufficient to deposit nickel metal by decomposition of said metal vapor onto said core particles to a depth of about 0.0005 to about 0.005 inches.

3. A method of preparing catalysts which comprises the steps of heating core particles in a closure to a temperature sufficient to decompose a metal vapor comprising selenium hydride upon contact therewith, continuously feeding said heated core particles downwardly into a vertically arranged isolated plating zone, continuously introducing a gas comprising selenium hydride into said plating zone counter-current to the direction of movement of said core particles, and continuously removing said core particles from said plating zone after being subjected to a plating action in a non-oxidizing atmosphere for a time sufficient to deposit selenium metal by decomposition of said metal vapor onto said core particles to a depth of about 0.0005 to about 0.005 inches.

4. A method of preparing catalysts which comprises the steps of heating core particles in a closure to a temperature sufficient to decompose a metal vapor comprising chromium carbonyl upon contact therewith, continuously feeding said heated core particles downwardly into a vertically arranged isolated plating zone, continuously introducing a gas comprising chromium carbonyl into said plating zone counter-current to the direction of movement of said core particles, and continuously removing said core particles from said plating zone after being subjected to a plating action in a non-oxidizing atmosphere for a time sufficient to deposit chromium metal by decomposition of said metal vapor onto said core particles to a depth of about 0.0005 to about 0.005 inches.

5. A method of preparing catalysts which comprises the steps of heating core particles in a closure to a temperature sufficient to decompose a metal vapor comprising tin hydride upon contact therewith, continuously feeding said heated core particles downwardly into a vertically arranged isolated plating zone, continuously introducing a gas comprising tin hydride into said plating zone counter-current to the direction of movement of said core particles, and continuously removing said core particles from said plating zone after being subjected to a plating action in a non-oxidizing atmosphere for a time sufficient to deposit tin metal by decomposition of said metal vapor onto said core particles to a depth of about 0.0005 to 0.005 inches.

6. A method of preparing catalysts which comprises the steps of heating core particles in a closure to a temperature sufficient to decompose a metal vapor comprising cobalt carbonyl upon contact therewith, continuously feeding said heated core particles downwardly into a vertically arranged isolated plating zone, continuously introducing a gas comprising cobalt carbonyl into said plating zone counter-current to the direction of movement of said core particles, and continuously removing said core particles from said plating zone after being subjected to a plating action in a non-oxidizing atmosphere for a time sufficient to deposit cobalt metal by decomposition of said metal vapor onto said core particles to a depth of about 0.0005 to about 0.005 inches.

OLIVER F. DAVIS.
HERMAN NACK.

REFERENCES CITED

The following references are of record in the file of this patent:

UNITED STATES PATENTS

| Number | Name | Date |
| --- | --- | --- |
| 2,132,613 | Francon | Oct. 11, 1938 |
| 2,234,568 | Linckh | Mar. 11, 1941 |
| 2,250,421 | Riblett | July 22, 1941 |
| 2,332,309 | Drummond | Oct. 19, 1943 |
| 2,533,071 | Vesterdal et al. | Dec. 5, 1950 |